Figure 1:
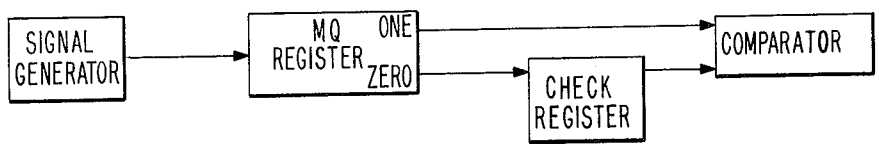

Feb. 22, 1966     L. C. HIGBY, JR     3,237,157
APPARATUS FOR DETECTING AND LOCALIZING
MALFUNCTIONS IN ELECTRONIC DEVICES
Filed Dec. 30, 1960     2 Sheets-Sheet 1

INVENTOR
LEONARD C. HIGBY, JR.
BY George J. Hetter
ATTORNEY

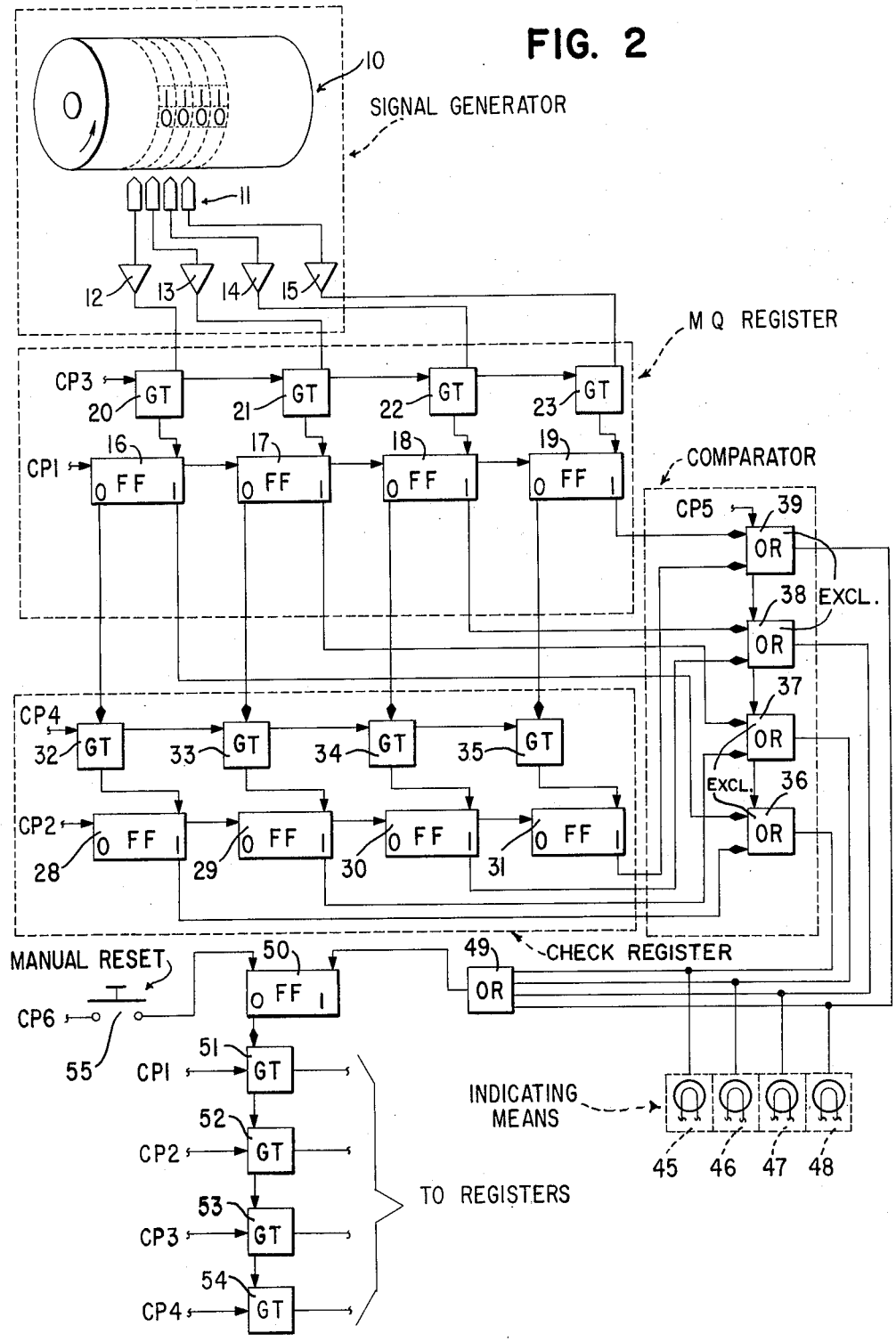

United States Patent Office
3,237,157
Patented Feb. 22, 1966

3,237,157
APPARATUS FOR DETECTING AND LOCALIZING MALFUNCTIONS IN ELECTRONIC DEVICES
Leonard C. Higby, Jr., Endicott, N.Y., assignor to International Business Machines Corporation, New York, N.Y., a corporation of New York
Filed Dec. 30, 1960, Ser. No. 79,782
4 Claims. (Cl. 340—146.1)

The present invention relates generally to electronic data processing equipment and in particular to a novel system for detecting and localizing failures in such equipment.

Present day data processing equipment, such as computers for example, are extremely complex apparatus composed of a number of "building block" units each of which consists of a great variety and number of different electrical components. As a result of this involved nature, if a malfunction arises or if complete inoperability results, it has been very difficult heretofore to determine precisely which part of the total apparatus is not working properly in order that it may either be replaced entirely, or itself examined to determine which component or components must be repaired or replaced to make it operable. For example, although a particular malfunction may be finally attributed directly to the failure of but a single resistor, capacitor or other such component which could be replaced quickly and relatively inexpensively, the time and effort which had to be expended in order to determine even in which portion of the apparatus the defective component was located was frequently considerable.

Obviously, during those periods while a computer is being repaired it is unavailable for use. This not only can be costly in a commercial production operation, but also can have disastrous effects in a case where a computer is closely integrated into the operation of an aircraft or missile, for example. Thus, whereas in a ground installation, faulty equipment can be removed and replaced in toto, in an aircraft such a procedure is obviously out of the question and failure while the craft is airborne can be disastrous for the mission of the aircraft and/or result in great danger to its occupants.

Additionally, the degree of difficulty associated with this phase of maintenance strongly influences other facets of the over-all maintainability picture, such as replacement parts, logistics, personnel requirements and test equipment needed, among other things. In fact, these fatcors may be of critical importance in regard to aircraft or missiles where weight and space requirements are at a premium.

It is, therefore, a primary object of the invention to provide a data processing equipment failure location system which is incorporated as an integral part of the equipment.

Another object of the invention is to provide a system for testing different functional units of a data processing apparatus independently and indicating the location of a failure within such units.

A still further object of the invention is to provide a system for repetitively and rapidly testing data processing apparatus functional units to detect and locate intermittent failures.

Briefly, the invention contemplates the provision of signal generating means for producing coded signals corresponding to pairs of binary test words, each pair consisting of an "inquiry" word and a "response" word. The inquiry word containing known binary information is presented to a unit to be tested and the output of the unit is converted to the binary complement of the inquiry word and stored. The response word containing information that is the binary complement of the inquiry word is similarly stored. Both sets of stored information are fed into a compare circuit where they are compared bit for bit. If any position, or bit, of one of the compared words is in disagreement with the corresponding bit in the other compared word, an error signal is produced indicating which position of the word is in error thereby locating both the particular malfunctioning apparatus and the specific part of the apparatus that is operating improperly.

The foregoing and other objects, features and advantages that will be apparent from the following more particular description of a preferred embodiment of the invention as illustrated in the accompanying drawings.

Figure 3:
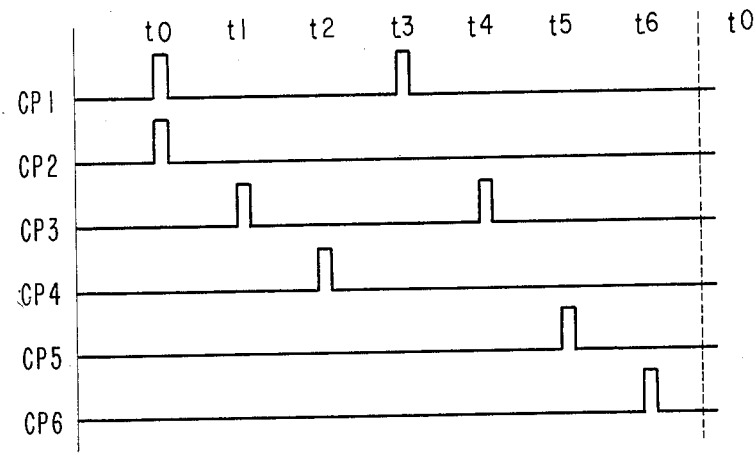
Figure 4:
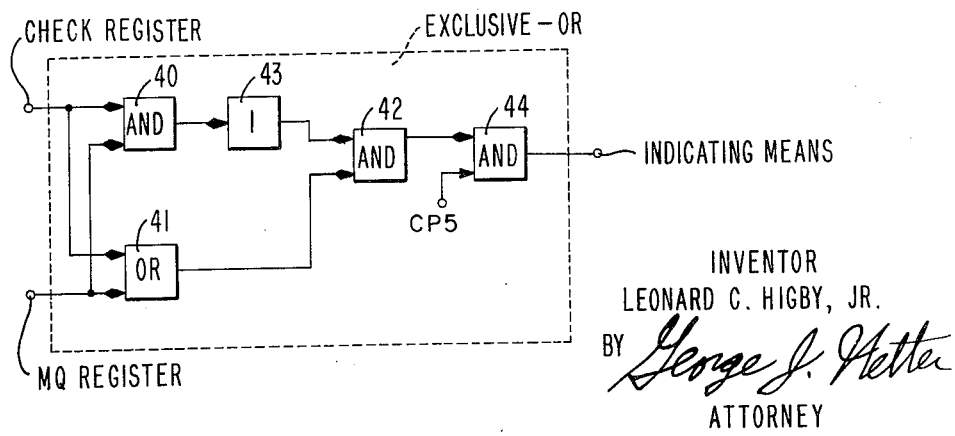

In the drawings:
FIG. 1 is a diagrammatic representation of a system constructed in accordance with this invention;
FIG. 2 illustrates a preferred embodiment of the apparatus of the invention;
FIG. 3 is a graph of the timing control pulses used with the apparatus of FIG. 2; and
FIG. 4 shows a preferred form of compare circuit for use in the invention.

With reference especially to FIG. 1, an examination of the more generalized structure and requirements of each of the major functional units will be entered into at this time.

SIGNAL GENERATOR

In addition to conventional operational data, this unit for present purposes contains a special set of coded test signals corresponding to one or more pairs of binary words, where each pair includes an "inquiry" word and a "response" word, and the response word of a given pair is the binary complement of its companion inquiry word.

Further, the test words have a sufficient number of bits so as to enable complete simultaneous testing or actuation of all positions of the functional units of the equipment being tested. For example, if the arithmetic register of a computer being tested has a total parallel input capacity of acceptance of 22 bits, then the words for testing this register to its full capacity must also have a 22 bit magnitude.

No one particular type of unit is required for the proper functioning or the use of the system of the invention. However, in order to perform rapid and repetitive testing for the determination and location of intermittent failures, which is a valuable facet of the invention, it is important that the signal generator be able to provide such signal information in that manner.

Any of a number of different types of devices meet the above requirements such as, for example, magnetic drum storage means, magnetic tapes, magnetic disk memories and core memories.

One such a signal generator of the magnetic core type is the memory element 21B illustrated in the U.S. Patent 2,914,248 to Ross et al.

MQ REGISTER

This register is a type of storage device normally used for performing the fundamental arithmetic operations and/or other more sophisticated computations that the equipment is capable of providing and is generally comprised of a plurality of individually settable bistable elements.

As such, this register is conventionally an integral part of data processing equipment or computers and, therefore, does not have to be added in order to practice the invention. On being properly impulsed from the signal generator, the register can provide a first output at One (1) which is binarily identical to the input word, and a second output available at Zero (0) each bit of which is the binary complement of the corresponding input word.

The memory address register shown in FIG. 24 of the Ross et al. patent and described in detail therein exemplifies a satisfactory register for present purposes.

CHECK REGISTER

This register can be of the same general construction as the MQ register or it can be a less sophisticated structure since the ability to convert a given input to its binary complement is not a requisite of this register whereas it is for the MQ register.

Such a register can, in many cases, depending on the overall design and structure of the data processing apparatus, comprise a unit which during normal operation of the equipment performs other services as its primary function while also serving in its present capacity during the practice of the invention.

As to the broad quantitative and functional requirements, this register has at least as large parallel word input capacity as the MQ register and is selectively impulsable to receive, store and read out information.

The register of the Ross et al. patent referenced above in regard to the MQ register is a full equivalent for this register also.

COMPARATOR

The comparator is comprised generally of a plurality of EXCLUSIVE–OR logic circuits, one for each corresponding pair of bits in the inquiry and response words and having individual and separate inputs and outputs. With such a circuit, the only time an output is obtained is when the corresponding paired inputs differ.

The output of each position, i.e., each EXCLUSIVE–OR circuit, is operably connected to a separate indication means, such as a signal light, so that when an error is detected in any position of the test word, visual indication is obtained of the exact position in which the error exists. Also, whenever an error signal is so obtained, it is used to prevent a change in state of the registers thereby maintaining the error indications in each of the registers.

OPERATION

Still referring to FIG. 1, it is assumed that the signal generator can provide a plurality of distinct coded signals or words in parallel, i.e., simultaneous read-out from different output positions, and also provide a plurality of these words in a sequence where the words differ from one another in a predetermined manner. The essential characteristic of these signals is that they can exist in either one of two possible states, i.e., they are binary. We shall term these levels as "0" and "1" realizing that they can refer to different voltage levels, current levels or other suitable distinguishing means.

Although in a preferred embodiment of the invention set forth herein, the test words provided by the generator were actually of 22-bit magnitude, for simplicity in the following description it is assumed that the test words and the capacity of the units tested are all of 4-bit magnitudes.

First, a 4-bit inquiry word (1111 for example) is read into the MQ register. The register is then impulsed to provide an output at ZERO, i.e., the binary complement of the word, or 0000, and present this to the check register. Accordingly, the MQ register now contains a setting of 1111 and the check register a setting of 0000.

The comparator is inhibited from reading out at this time and therefore does not now indicate an error signal even though each position of the two registers differ from one another.

With the MQ and check registers continuing to hold 1111 and 0000, respectively, the corresponding response word is obtained from the signal generator which is the binary complement of the inquiry word, or 0000, and read into the MO register. This causes each position of the register to change from the 1 condition to the 0 condition and store the response word 0000. Simultaneously, with the setting up of the response word in the MQ register, the check register is prevented from reading in the ZERO output of the MQ register and therefore the check register continues to hold the word 0000.

At a predetermined time later, the comparator is impulsed to compare the information from the two registers. If each position of the two words agree, i.e., as here the readout from each register being 0000, then there is complete agreement and the comparator will not indicate an error. However, if there is an error, for example in the first position, then a signal is made available through the first position of the comparator to indicate by a light or other such means that this position is in error.

When the comparator notes an error, and thus incorrect operation of a unit being tested, the MQ and check registers are controlled to prevent additional impulsing by information from the signal generator which would otherwise remove the error settings in the registers and thereby impede the taking of corrective measures. Accordingly, the error will stay in the registers and comparator until an affirmative resetting is made.

SPECIFIC STRUCTURE

Turning now to FIGS. 2 and 3 and the detailed structure of a preferred embodiment of the invention, the signal generator is seen to comprise generally a magnetic drum 10 having a special portion containing the required test information that for present purposes will be considered to include a plurality of pairs of words of 4-bit magnitude, each pair consisting of two words binary complements of each other and all arranged in sequential order. Four read heads indicated generally at 11 are arranged in operative position relative to the drum 10 for individually and simultaneously reading out the four respective positions of each of the test words. The outputs of each of the read heads are fed into separate read amplifiers 12–15 for providing separate signal pulses of usable magnitude for each bit of the words read from the drum.

The drum 10 also includes a plurality of timing tracks for generating clock pulses to provide a correct timing relationship between the various functions in general and, in particular, the associated functions of the present test procedure. Thus, for our purposes six (6) clock pulses are generated, CP1–CP6, the timing relationship of which is indicated in FIG. 3.

The MQ register comprises four flip-flops 16–19 which receive the amplified signals from the generator through AND gates (GT) 20–23 which are actuated by CP3. These flip-flops have a One (1) output which is binarily equivalent to the input signal and a Zero (0) output which is the binary complement of One. These flip-flops are of the same type set forth in the above mentioned Ross et al. patent that require resetting before impulsing with a signal and which is accomplished here by CP1.

By way of explanation, resetting of the flip-flops of the MQ register establishes a "1" status at the Zero output and a "0" status at the One output. Accordingly, on receiving a "1" input, for example, after resetting changes the One output to a "1" and the Zero output to a "0." On the other hand, if the input signal is a "0" after resetting the outputs remain at the reset condition.

For indicating the difference between pulses and voltage levels, the convention is adopted in the drawings of illustrating the former by arrowheads and the latter by the diamond symbol.

The check register is of similar construction to the MQ register having four flip-flops 28–31 fed through gates 32–35, respectively and reset by CP2. These gates are sampled at CP4 time. Signals from the Zero output of the flip-flops 16–19 are fed into the respective gates 32–35.

The comparator is comprised of four separate EXCLUSIVE–OR circuits 36–39 each of which receives one position of the One output of the MQ register and the corresponding output from the check register. The comparator is controlled to operate only at CP5 time.

Examining the specifics of the EXCLUSIVE–OR circuit utilized in the comparator (FIG. 4), it is seen that the two register outputs are both introduced to the input of an AND gate 40 and an OR gate 41. The output of the OR gate is fed into the input of another AND gate 42 and the output of gate 40 is presented to the input of an inverter 43 (I) the output of which is also presented to the input of gate 42. When the two inputs to the gates 40 and 41 are the same, the OR gate output is up for the gate 42, but since the output of gate 40 is up, the output of inverter 43 is down and gate 42 is not actuated. However, if the EXCLUSIVE–OR inputs are not in agreement, in addition to OR gate 41 providing an input to gate 42, the down output of gate 40 is converted by the inverter to an up condition and gate 42 passes an error signal. At CP5 time such an error signal is gated by an AND gate 44 to the indicating means.

The indicating means includes four separate light sources 45–48 each so adapted as to be actuable by the signal output of one of the EXCLUSIVE–OR's of the comparator.

DETAILED OPERATION

For succinctness of expression and clarity of explanation, it is assumed that the test set previously set into the drum 10 consists of a single inquiry word 1111 followed by a response word 0000. It is, of course, to be understood that such a test can consist of any number of pairs of inquiry and response words where the inquiry words can have any predetermined binary configuration. In fact, it is advisable that the test words be so constructed as to give the "worst pattern" for the unit being tested.

At $t0$ time, the registers are reset by CP1 and CP2 pulses so that the One output of each flip-flop is at a "0" level and the Zero output stands at a "1" level.

At $t1$ times the drum is synchronized such that the inquiry word 1111 is disposed in opposed relation to the read heads 11 and read off the drum by CP3 pulses sampling gates 20–23. After amplification by the read amplifiers 12–15, the signals pass through gates 20–23 now open. The gated signals impulse the flip-flops 16–19 to the "1" condition at the One output and to the "0" state at the Zero output.

At $t2$, the "0" condition of the Zero output of the MQ register is presented through the gates 32–35 to the input of flip-flops 28–31 of the check register. Since the One output of this register has already been set to a "0" state, there is no change effected in the register at this time.

Since CP5 is not up, there is no comparing performed by the comparator at this time despite the fact that corresponding positions of the two registers are all in disagreement.

At $t3$ time the MQ register is reset as before, i.e., "0" at the One output and "1" at the Zero output. Since no CP4 and CP5 pulses are present now the check register is unaffected by the resetting of the MQ register and no comparison takes place.

At $t4$ time, this permits the response word 0000 on the drum 10 to be read out to pass through gates 20–23 and be presented to the input of flip-flops 16–19. Since the One output of these flip-flops are each at the reset condition, i.e., "0," there is no change effected in the register. Also, since CP4 is down, no change in the check register is produced.

At $t5$ time each of the EXCLUSIVE–OR's comprising the comparator is made operative by CP5 pulses. As shown above, if each of the paired inputs to the comparator is in mutual agreement, no signal is available to the indicating lights 45–48.

If, however, one or more of the paired inputs to the comparator are in mutual disagreement, a signal is available from each of those positions in error to the corresponding indicating lights.

Simultaneously, with the visual indication of an error, the error signals are gated through a multiple input OR gate 49 to the input of a flip-flop 50. The Zero output of this flip-flop is presented to the inputs of AND gates 51–54 so that when the Zero output is in an up level condition, these gates permit the clock pules CP1, CP2, CP3 and CP4 to pass and be available to the registers. This up level condition of the Zero output can only be obtained by actuation of a manual reset button 55 which causes the flip-flop 50 to reset at $t6$ time by CP6 pulses. When an error signal is made available from the OR gate 49 to the input of the flip-flop 50, this sets the Zero output to the "0" state closing AND gates 51–54 preventing further information being read into the registers and thereby holding the error information in the registers. This is an important aspect of the invention in that a mere transitory indication of incorrect operation of a register is of little use, whereas fixing the erroneous information in the registers provides the needed time for observing the apparatus closely and taking appropriate corrective measures.

The error status will continue in the equipment until the manual reset button 55 is depressed switching the Zero output of the flip-flop 50 once again to the up level enabling gates 51–54 and passing the clock pulses to the registers. Then the procedure will continue as before with the reading of new test words and comparing their settings in the registers.

Having established that the MQ and check registers are in good operating condition as set forth above, it is a further contemplation of the invention to substitute other registers or such functional units for either the MQ or check registers. Accordingly, by proceeding as before, these new units or registers can be satisfactorily tested and if found to be operating improperly, the faulty part of the apparatus can be located.

Although a single inquiry and response word have been used in the above description, it is considered within the contemplation of the invention to provide a sequence of inquiry and response words which are read rapidly and repetitively into a unit being tested in order to detect any intermittent errors which might not show up under just a single or perhaps even several testing operations. This is an important aspect of the invention since intermittent errors cannot only adversely affect the computer operation to the same degree as a more permanent type of failure, but they are inherently very difficult to detect and locate due to their infrequent and/or short-lived occurrence.

Additional beneficial results can be obtained particularly in regard to the test examination of the check register when the test is conducted with one or more sets of two special pairs of test words applied in sequence. Thus, if the second inquiry word is the full binary complement of the first inquiry word in each set (or in effect identical to the first response words), the registers are not only statically placed in both possible binary states but both possible dynamic changes between the two states are achieved, i.e., 1–0 and 0–1. This enhances the testing procedure since certain types of malfunctions only occur during one of the dynamic states and of course would not necessarily be detected by an examination of one of the static state conditions of a register.

While the invention has been particularly shown and described with reference to a preferred embodiment thereof, it will be understood by those skilled in the art that various changes in form and details may be made therein without departing from the spirit and scope of the invention.

What is claimed is:

1. A system for localizing inoperability in a device consisting of a plurality of electrical bistable elements having individual inputs to which information representing signals may be applied for setting the elements to first or second binary information representing states, each said element having true and complement outputs operable to supply output signals representing respectively the binary information state to which the element is set and the binary complement of that state, comprising:

signal generating means for providing test signals including at least one inquiry word having a number of bits equal to the number of elements in the device and a response word which is the binary complement of the corresponding inquiry word;

means for connecting the signal generating means to the inputs of said device;

register means connected to receive the signals provided by the complement outputs of the elements and to provide output signals which are the binary equivalent thereof; and bit-for-bit comparing and indicating means operably connected to the true outputs of the elements of the device and the outputs of the register means for comparing corresponding positions of the said two outputs and indicating those positions having differing binary states.

2. An arrangement for detecting malfunctions of a signal storage device which is operable in response to application thereto of a signal representing a binary value for storing said value and supplying upon readout true and complement signals representing respectively the binary value and its binary complement, comprising:

a signal generator for supplying in time sequence a first signal representing a binary value and a second signal representing the binary complement of said value;

means for supplying said first and second signals to said storage device;

means operable after application of the first signal to the storage device and prior to application of the second signal for reading out the complement of the binary value stored in said device;

means operable subsequent to application of the second signal for reading out the binary value stored in said device; and comparator means for comparing the values read out from said signal storage device prior to and subsequent to application of the second signal and for supplying an error indicating signal in response to one predetermined result of said comparison.

3. An arrangement as in claim 2, in which the signal generator further includes means for producing the first and second signals repetitively whereby intermittent inoperability of the signal storage device is detected.

4. Apparatus for detecting malfunctions in a signal storage device which is capable of performing a predetermined logical operation on signals supplied thereto and supplying an output representative of said logical operation comprising:

means for generating a first and second time-spaced signals, the second of said time-spaced signals representing the result of said predetermined logical operation performed on the first signal;

means for applying said first signal to said device;

means operable in response to application of the first signal to said device for storing the logical operation representing output of said device; and comparing means for comparing the stored output with the second signal and indicating the relationship therebetween.

References Cited by the Examiner

UNITED STATES PATENTS

| | | | |
|---|---|---|---|
| 2,328,750 | 9/1943 | Smith, et al. | 324—73 |
| 3,071,723 | 1/1963 | Gabor | 340—146.1 X |
| 3,105,955 | 10/1963 | Mauchly | 340—146 X |

ROBERT C. BAILEY, *Primary Examiner.*

SAMUEL BERNSTEIN, MALCOLM A. MORRISON,
*Examiners.*